(12) United States Patent
Zhang et al.

(10) Patent No.: US 10,042,560 B2
(45) Date of Patent: Aug. 7, 2018

(54) METHOD AND STORAGE ARRAY FOR PROCESSING A WRITE DATA REQUEST

(71) Applicant: HUAWEI TECHNOLOGIES CO., LTD., Shenzhen, Guangdong (CN)

(72) Inventors: Wei Zhang, Shenzhen (CN); Xianhong Lu, Shenzhen (CN); Mingchang Wei, Shenzhen (CN); Chenyi Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 15/449,027

(22) Filed: Mar. 3, 2017

(65) Prior Publication Data

US 2017/0177223 A1    Jun. 22, 2017

Related U.S. Application Data

(63) Continuation of application No. PCT/CN2014/086531, filed on Sep. 15, 2014.

(51) Int. Cl.
    *G06F 12/00*     (2006.01)
    *G06F 3/06*      (2006.01)
    *G06F 12/0871*   (2016.01)

(52) U.S. Cl.
    CPC ............ *G06F 3/061* (2013.01); *G06F 3/0619* (2013.01); *G06F 3/0638* (2013.01); *G06F 3/0659* (2013.01); *G06F 3/0683* (2013.01); *G06F 12/0871* (2013.01); *G06F 2212/1016* (2013.01); *G06F 2212/1032* (2013.01);
    (Continued)

(58) Field of Classification Search
    CPC ............ G06F 12/0623; G06F 12/0802; G06F 12/0868; G06F 12/1045; G06F 12/1081; G06F 13/36; G06F 13/4221; G06F 13/4234
    USPC ...... 711/113, 141, 145, 154; 710/5, 52, 305; 712/11, 29, 225
    See application file for complete search history.

(56) References Cited

U.S. PATENT DOCUMENTS 7,062,675 B1 * 6/2006 Kemeny ............. G06F 11/1441
                                                    711/135
8,171,098 B1   5/2012 Zelikov et al.
(Continued)

FOREIGN PATENT DOCUMENTS

CN        102063274 A     5/2011
CN        102866935 A     1/2013
(Continued)

*Primary Examiner* — Reba I Elmore
(74) *Attorney, Agent, or Firm* — Huawei Technologies Co., Ltd.

(57) ABSTRACT

According to a write data request processing method and a storage array provided in the embodiments of the present invention, a controller is connected to a cache device via a switching device, an input/output manager is connected to the controller via the switching device, and the input/output manager is connected to a cache device via the switching device. The controller obtains a cache address from the cache device for to-be-written data according to the write data request, the controller sends an identifier of the cache device and the cache address to the input/output manager via the switching device, and the input/output manager writes the to-be-written data to the cache address via the switching device.

12 Claims, 6 Drawing Sheets

(52) U.S. Cl.
CPC .. *G06F 2212/152* (2013.01); *G06F 2212/261* (2013.01); *G06F 2212/604* (2013.01)

(56) References Cited

U.S. PATENT DOCUMENTS

| | | | | |
|---|---|---|---|---|
| 8,296,476 | B2* | 10/2012 | Zhang | G06F 3/0626 710/17 |
| 9,098,404 | B2 | 8/2015 | Yang et al. | |
| 2004/0153576 | A1* | 8/2004 | Hansmann | G06F 17/30902 709/248 |
| 2005/0102555 | A1* | 5/2005 | Matsumoto | G06F 3/0601 714/6.3 |
| 2006/0026345 | A1* | 2/2006 | Nishimoto | G06F 11/1076 711/114 |
| 2008/0209101 | A1* | 8/2008 | Kanai | G06F 3/0607 711/100 |
| 2009/0327600 | A1 | 12/2009 | Yarnell | |
| 2010/0274965 | A1 | 10/2010 | Cleveland et al. | |
| 2011/0225358 | A1* | 9/2011 | Kaneko | G06F 12/0866 711/113 |
| 2012/0005430 | A1 | 1/2012 | Watanabe et al. | |
| 2013/0018853 | A1 | 1/2013 | Jayaraman et al. | |
| 2013/0111117 | A1* | 5/2013 | Yang | G06F 3/061 711/103 |
| 2013/0238876 | A1* | 9/2013 | Fiske | G06F 3/0641 711/216 |
| 2013/0332558 | A1 | 12/2013 | Condict et al. | |
| 2014/0032697 | A1 | 1/2014 | Shapiro et al. | |
| 2014/0089562 | A1 | 3/2014 | Deguchi et al. | |
| 2015/0095696 | A1* | 4/2015 | Hess | G06F 11/108 714/6.24 |
| 2015/0215236 | A1* | 7/2015 | Joshi | H04L 47/806 707/754 |
| 2016/0026653 | A1* | 1/2016 | Caro | G06F 17/30159 707/692 |

FOREIGN PATENT DOCUMENTS

| | | |
|---|---|---|
| CN | 203063274 U | 7/2013 |
| JP | 2005025371 | 1/2005 |
| JP | 2013517537 | 5/2013 |

* cited by examiner

METHOD AND STORAGE ARRAY FOR PROCESSING A WRITE DATA REQUEST

CROSS-REFERENCE TO RELATED APPLICATIONS

This application is a continuation of International Application No. PCT/CN2014/086531, filed on Sep. 15, 2014, which is hereby incorporated by reference in its entirety.

TECHNICAL FIELD

The present invention relates to the field of information technologies, and in particular, to a write data request processing system and method in a storage array.

BACKGROUND

Figure 1:
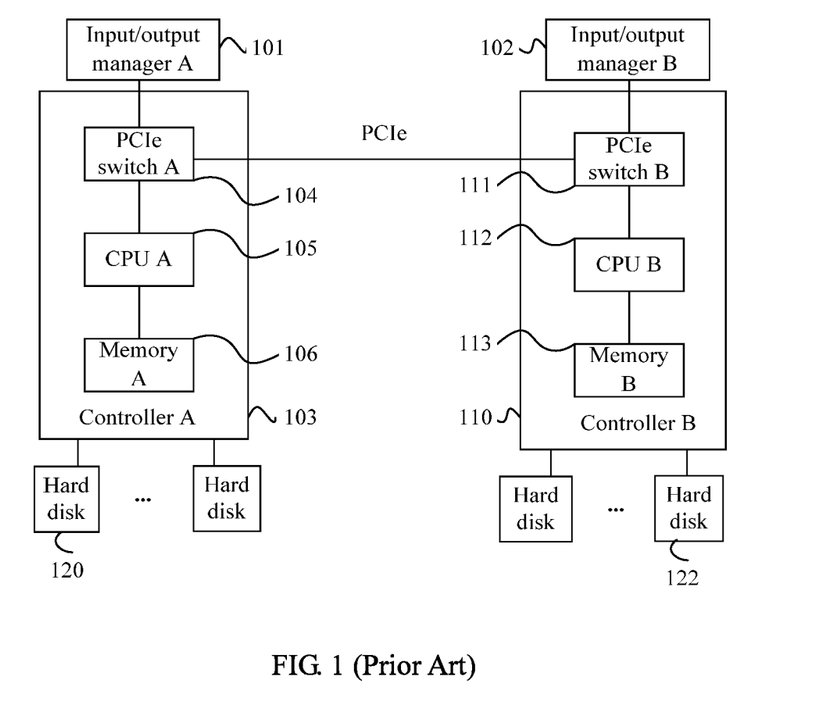
FIG. 1 is a structural diagram of a storage array in the prior art.

A storage array generally includes one engine, and one engine includes two controllers, which is generally referred to as a dual-controller structure. As shown in FIG. 1, a storage array includes an input/output manager A 101, an input/output manager B 102, a controller A 103 and a controller B 110. The input/output manager A 101 is connected to the controller A 103, and the input/output manager B 102 is connected to the controller B 110. The controller A 103 includes a peripheral component interconnect express (PCIe) switch A 104, a central processing unit (CPU) A 105 and a memory A 106; and the controller B 110 includes a PCIe switch B 111, a CPU B 112 and a memory B 113. The PCIe switch A 104 is connected to the PCIe switch B 111. In the storage array shown in FIG. 1, the input/output manager A 101 receives a write data request. A target logical unit (LU) of the write data request is homed to the controller A 103. That is, the controller A 103 writes data carried in the write data request into the target LU. The input/output manager A 101 sends the write data request to the CPU A 105 via the PCIe switch A 104 of the controller A 103, and the CPU A 105 writes the data carried in the write data request and metadata into the memory A 106. The CPU A 105 writes the data and the metadata in the memory A 106 into a hard disk (120, 122) according to settings of the storage array.

The foregoing data writing process in a storage array consumes CPU computing power of a controller and memory resources of the controller, and affects performance of the storage array severely.

SUMMARY

According to the embodiments of the present invention, a storage array includes a controller, an input/output manager, a switching device, and a cache device. The controller, the input/output manager, and the cache device interconnect each other via the switching device. The input/output manager sends a write data request to the controller via the switching device. The controller obtains a cache address from the cache device for to-be-written data according to the write data request, and sends an identifier of the cache device and the cache address to the input/output manager via the switching device, and the input/output manager writes the to-be-written data to the cache address via the switching device, thereby saving CPU computing resources of the controller and memory resources of the controller and improving data writing efficiency.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and other drawings may still be derived from these accompanying drawings.

DESCRIPTION OF EMBODIMENTS

The following clearly describes the technical solutions in the embodiments of the present invention with reference to the accompanying drawings in the embodiments of the present invention.

Figure 2:
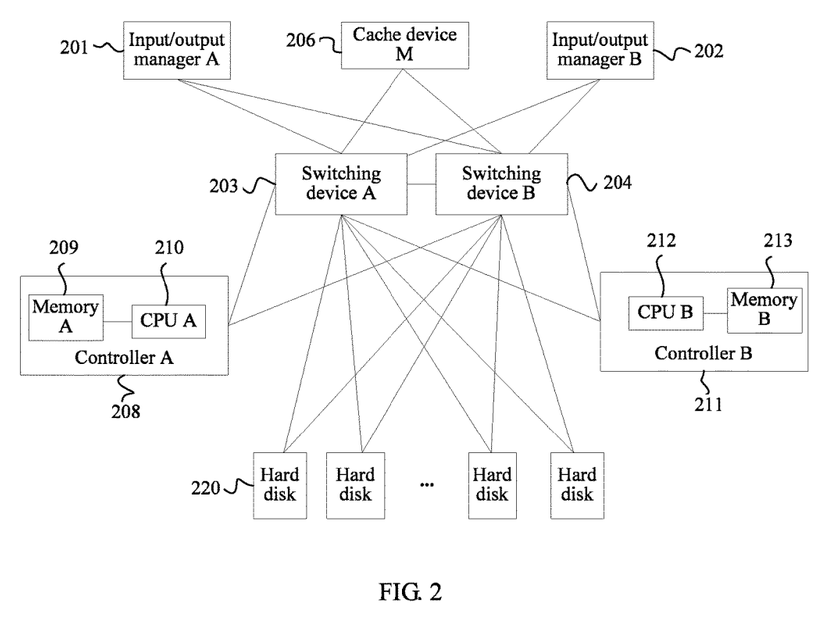
FIG. 2 is a structural diagram of a storage array according to an embodiment of the present invention.

A storage array provided in the embodiments of the present invention, such as a storage array shown in FIG. 2, includes an input/output manager A 201, a controller A 208, an input/output manager B 202, a controller B 211, a switching device A 203, a switching device B 204, and a cache device M 206. The controller A 208 includes a CPU A 210 and a memory A 209, where the CPU A 210 communicates with the memory A 209 via a bus; and the controller B 211 includes a CPU B 212 and a memory B 213, where the CPU B 212 communicates with the memory B 213 via a bus. The input/output manager A 201 is connected to the switching device A 203 and the switching device B 204, and the input/output manager B 202 is connected to the switching device A 203 and the switching device B 204. The switching device A 203 is interconnected with the switching device B 204. The switching device A 203 and the switching device B 204 are both connected to the cache device M 206. The cache device M 206 will be described in detail below. The controller A 208 is connected to the switching device A 203 and the switching device B 204, and the controller B 211 is connected to the switching device A 203 and the switching device B 204. Based on the foregoing description, a fully-interconnected architecture is formed by the input/output manager A 201, the input/output manager B 202, the controller A 208, and the controller B 211 around the switching device A 203 and the switching device B 204. In the storage array shown in FIG. 2, the switching device A 203 is connected to all hard disks 220, and the switching device B 204 is also connected to all hard disks 220. The controller A 208 and the controller B 211 both communicate with all the hard disks 220 shown in FIG. 2. Specifically, the controller A 208 communicates with all the hard disks 220 via the switching device A 203, and the controller B 211 communicates with all the hard disks 220 via the switching device B 204. The controller A 208 is configured to virtualize the hard disks 220 to form a logical unit LU A, which is available to a host A. LU A is mounted to the host A and the host A performs a data access operation on the LU A via the controller A 208. Here, the LU A is homed to the controller A 208, that is, the controller A 208 is a home controller of the LU A. Likewise, the controller B 211 is configured to virtualize the hard disks 220 to form a logical unit LU B, which is available to a host B. The LU B is mounted to the host B, and the host B performs a data access operation on the LU B via the controller B 211. Here it is termed that the LU B is homed to the controller B 211, that is, the controller B 211 is a home controller of the LU B. A host herein may be a physical host (or referred to as a physical server) or a virtual host (or referred to as a virtual server). The logical unit LU is generally referred to as a logical unit number (LUN) in the industry. Allocating an LUN to a host actually refers to allocating an identifier of an LU to the host, so that the LU is mounted to the host. Therefore, the LU and the LUN mean the same herein. In the storage array shown in FIG. 2, the switching devices A 203 and B 204 may be PCIe switching devices, or may be non-volatile memory express (NVMe) transmission bus switching devices, serial attached small computer system interface (SAS) switching devices, or the like, which is not limited by the embodiments of the present invention. When the switching devices A 203 and B 204 are PCIe switching devices, a hard disk connected to the PCIe switching devices is a hard disk with a PCIe protocol interface; when the switching devices A 203 and B 204 are NVMe switching devices, a hard disk connected to the NVMe switching devices is a hard disk with a NVMe protocol interface; when the switching devices A 203 and B 204 are SAS switching devices, a hard disk connected to the SAS switching devices is a hard disk with a SAS protocol interface. The hard disks 220 shown in FIG. 2 may be mechanical hard disks, solid state disks (SSD), or hard disks of other medium. As regards the hard disks in the storage array shown in FIG. 2, storage medium of different disks may be different, so that a hybrid hard disk storage array is formed, which is not limited by the embodiments of the present invention.

The cache device M may be specifically a storage device formed by a volatile storage medium or a non-volatile storage medium, such as a phase change memory (PCM), or may be another non-volatile storage medium that is suitable to be used as a cache device, which is not limited by the embodiments of the present invention. The cache device M is configured to cache data. The following describes the cache device M with reference to specific embodiments of the present invention. In the embodiments of the present invention, that the switching device A is a PCIe switching device, the switching device B is a PCIe switching device, and the hard disk is an SSD with a PCIe protocol interface.

In the storage array shown in FIG. 2, the input/output manager A receives a write data request sent by a host. In an embodiment, the controller A is a home controller of the input/output manager A. Therefore, the input/output manager A receives a data operation request sent by the host. In a case that a request sending policy of the input/output manager A is not changed, the request is sent to the controller A by default according to the data operation request, so the controller A is referred to as a home controller of the input/output manager A. In an embodiment of the present invention, the input/output manager A receives a write data request sent by the host, and sends the write data request to the controller A via the PCIe switching device A or the PCIe switching device B. As regards the specific PCIe switching device via which the request is forwarded, it may be determined according to a preset rule. Once a PCIe switching device is selected, the input/output manager A communicates with the controller A via this PCIe switching device subsequently. Alternatively, the input/output manager A may also select a PCIe switching device randomly to communicate with the controller A, which is not limited by this embodiment of the present invention. This embodiment of the present invention uses an example in which the input/output manager A selects the PCIe switching device A to communicate with the controller A.

The write data request received by the input/output manager A carries an address of to-be-written data. The address of the to-be-written data includes an identifier of a target LU of to-be-written data, a logical block address (LBA) of the to-be-written data, and a length of the to-be-written data. The input/output manager A sends the write data request to the controller A. The controller A receives the write data request, and determines, according to the identifier of the target LU of the to-be-written data in the address of the to-be-written data, whether the controller A is a home controller of the target LU.

When the controller A is the home controller of the target LU, that is, the target LU is generated by the controller A by virtualizing hard disks and provided for the host. The controller A determines a cache device used to cache the to-be-written data, which is the cache device M in this embodiment of the present invention. An embodiment is: The controller A instructs, according to the write data request, the cache device M to allocate a cache address to the to-be-written data, and the cache device M allocates the cache address according to a length of the to-be-written data. The controller A obtains the cache address allocated by the cache device M to the to-be-written data (the cache address allocated by the cache device M to the to-be-written data is hereinafter referred to as a cache address M, and in an embodiment, the cache address includes a start address and a length). The controller A sends an identifier of the cache device M and the cache address M to the input/output manager A via the PCIe switching device A. The input/output manager A receives the identifier of the cache device M and the cache address M that are sent by the controller A, and writes the to-be-written data to the cache address M according to the identifier of the cache device M and the cache address M (or may directly write the to-be-written data to the cache address M). The controller A obtains only the cache address M allocated to the to-be-written data, and the input/output manager A directly writes the to-be-written data to the cache address M via the PCIe switching device A, which, compared with the prior art, saves CPU computing resources of the controller A and memory resources of the controller A and improves data writing efficiency.

The controller A establishes a correspondence among the address of the to-be-written data, the identifier of the cache device M, and the cache address M. When reading the to-be-written data, the controller A sends the cache address M of the to-be-written data to the input/output manager A, and the input/output manager A may read the to-be-written data from the cache address M of the to-be-written data (or may directly read the to-be-written data from the cache address M of the to-be-written data), thereby saving CPU computing resources of the controller A and memory resources of the controller A and improving data reading efficiency.

After conditions are satisfied, if the storage array does not perform data deduplication, the cache device M writes the to-be-written data into a target SSD of the storage array. The target SSD refers to an SSD for storing the to-be-written data. A specific process of writing the to-be-written data into the target SSD may be: The controller A sends the identifier of the cache device M and the cache address M to a controller of the target SSD via the PCIe switching device A or the PCIe switching device B. The controller of the target SSD directly reads the to-be-written data from the cache address M via the PCIe switching device A or the PCIe switching device B according to the identifier of the cache device M and the cache address M, and stores the to-be-written data. The controller of the target SSD sends a storage address of the to-be-written data in the target SSD to the controller A via the PCIe switching device A or the PCIe switching device B. The storage address of the to-be-written data in the target SSD includes an identifier of the controller of the target SSD and a logical storage address for storing the to-be-written data in the target SSD. The controller A establishes a correspondence between the address of the to-be-written data and the storage address of the to-be-written data in the target SSD.

Figure 3:
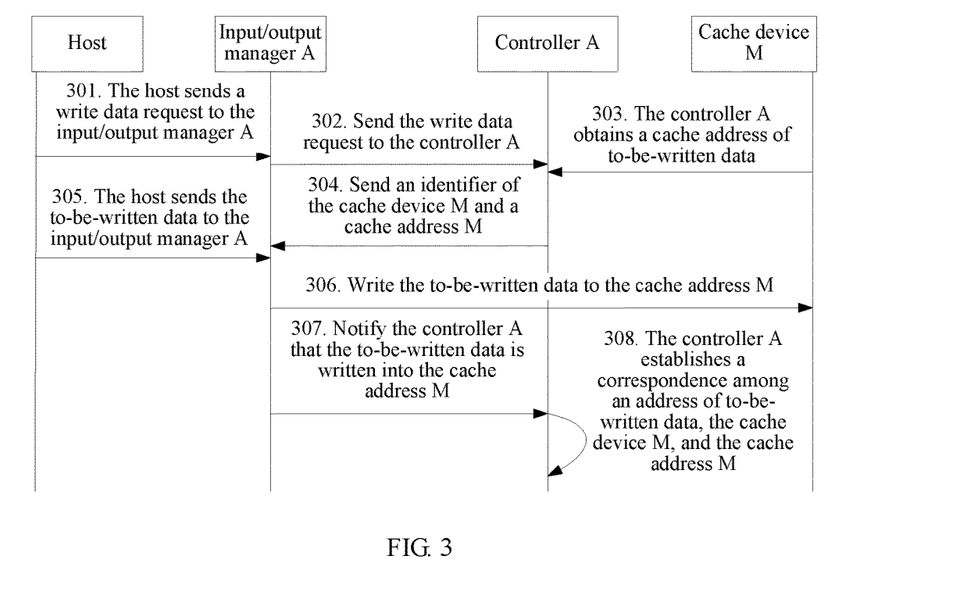
FIG. 3 is a flowchart of processing a write data request according to an embodiment of the present invention.

The foregoing process is specifically shown in FIG. 3.

Step 301: A host sends a write data request to an input/output manager A.

The input/output manager A is an input/output receiving management device in a storage array, and is responsible for receiving a data operation request sent by the host and forwarding the data operation request to a controller. In an embodiment of the present invention, the host sends a write data request that carries an address of to-be-written data to the input/output manager A. For example, the small computer system interface (SCSI) protocol may be used for the write data request. Alternatively, other protocols may also be used, which is not limited by this embodiment of the present invention.

Step 302: Send the write data request to a controller A.

In this embodiment of the present invention, the input/output manager A generally communicates with a specific controller. The input/output manager A may establish a correspondence with a controller in multiple manners, for example, according to a load of the controller, or according to a specific path selection algorithm, which is not limited by the present invention. The input/output manager A receives the write data request, and sends the write data request to the controller A via a PCIe switching device A or a PCIe switching device B. In this embodiment of the present invention, that the input/output manager A receives the write data request and sends the write data request to the controller A via the PCIe switching device A is used as an example.

Step 303: The controller A obtains a cache address of to-be-written data.

The controller A receives the write data request sent by the input/output manager A, and determines a cache device used to cache the to-be-written data, which is a cache device M in this embodiment of the present invention. In an embodiment, the cache device M allocates a segment of cache addresses to the controller A. In the segment of cache addresses, the controller A allocates a cache address M to the to-be-written data according to the length of the to-be-written data. In another embodiment, the controller A sends an instruction to the cache device M via the PCIe switching device A or the PCIe switching device B, where the instruction carries the length of the to-be-written data and instructs the cache device M to allocate a cache address to the to-be-written data. The controller A obtains the cache address M.

Step 304: Send an identifier of the cache device M and the cache address M.

The controller A obtains the cache address M, and sends the identifier of the cache device M and the cache address M to the input/output manager A via the PCIe switching device A, where the identifier of the cache device M is a device address.

Step 305: The host sends the to-be-written data to the input/output manager A.

The input/output manager A receives the identifier of the cache device M and the cache address M that are sent by the controller A, and receives the to-be-written data sent by the host.

Step 306: Write the to-be-written data to the cache address M.

The input/output manager A directly writes the to-be-written data to the cache address M via the PCIe switching device A according to the identifier of the cache device M and the cache address M. The input/output manager A receives, via the PCIe switching device A, a response indicating that the to-be-written data is written successfully that is sent by the cache device M. The input/output manager A sends a response indicating that the write data request is completed to the host.

Step 307: Notify the controller A that the to-be-written data is written to the cache address M.

The input/output manager A writes the to-be-written data to the cache address M successfully, and notifies the controller A that the to-be-written data is written to the cache address M.

Step 308: The controller A establishes a correspondence among the address of to-be-written data, the cache device M, and the cache address M.

The controller A receives the notification sent by the input/output manager A, and establishes a correspondence among the address of the to-be-written data, the cache device M, and the cache address M.

The cache device M allocates the cache address M to the to-be-written data, thereby establishing the correspondence between the address of the to-be-written data and the cache address M. The cache device M may obtain the address of the to-be-written data from a cache address allocation instruction sent by the controller A, and after allocating the cache address M, the cache device M establishes the correspondence between the address of the to-be-written data and the cache address M. In another embodiment, the cache device M is an exclusive cache device of a target LU, and is only used to cache data of the target LU, and therefore, the cache device M saves the correspondence among the target LU, an LBA in the target LU, and the cache address by default. The cache device M saves the correspondence among the target LU, the LBA in the target LU, and a segment of cache addresses of the cache device M by default. In this segment of cache addresses, the cache device M allocates the cache address M to the to-be-written data.

To improve reliability of the storage array and to cache multiple copies of the to-be-written data, in the prior art shown in FIG. 1, the input/output manager A sends the to-be-written data, the CPU A writes the to-be-written data to the memory A, the CPU A reads the to-be-written data from the memory A, and sends the to-be-written data to a PCIe switch B via a PCIe switch A. The PCIe switch B sends the to-be-written data to the CPU B, and the CPU B writes the to-be-written data to the memory B. In this embodiment of the present invention, to prevent loss of the to-be-written data in the cache device M, the storage array caches the to-be-written data into multiple cache devices. Therefore, that the to-be-written data is cached in two cache devices is used as an example. The storage array shown in FIG. 2 further includes a cache device N. The PCIe switching device A and the PCIe switching device B are both connected to the cache device N. Therefore, the controller A receives the write data request sent by the input/output manager A, and determines that the cache device M serves as a primary cache device to cache the to-be-written data, and that the cache device N serves as a secondary cache device to cache the to-be-written data. The controller A obtains the cache address that is allocated to the to-be-written data and located in the cache device M and the cache device N. In an embodiment, the controller A sends an instruction to each of the cache device M and the cache device N, where the instruction is used to instruct both the cache device M and the cache device N to allocate a cache address to the to-be-written data. The instruction carries the length of the to-be-written data. The cache address allocated by the cache device M to the to-be-written data is referred to as a cache address M, and the cache address allocated by the cache device N to the to-be-written data is referred to as a cache address N. The controller A obtains the cache address M and the cache address N. The controller A sends the identifier of the cache device M and the cache address M to the input/output manager A via the PCIe switching device A, and sends an identifier of the cache device N and the cache address N to the input/output manager A via the PCIe switching device A. In a specific implementation, the controller A may send the identifier of the cache device M and the cache address M, and the identifier of the cache device N and the cache address N, to the input/output manager A via one message, or via two messages respectively, which is not limited herein. In another embodiment, the cache device M allocates an exclusive segment of cache addresses to the controller A, which is only used to cache data of an LU of the home controller A. In this segment of cache addresses of the cache device M, the controller A directly allocates the cache address M to the to-be-written data. The cache device N allocates an exclusive segment of cache addresses to the controller A, and in the segment of cache addresses of the cache device N, the controller A directly allocates the cache address N to the to-be-written data.

The input/output manager A receives the identifier of the cache device M and the cache address M, and the identifier of the cache device N and the cache address N. The input/output manager A directly writes the to-be-written data to the cache address M via the PCIe switching device A according to the identifier of the cache device M and the cache address M, and the input/output manager A directly writes the to-be-written data to the cache address N via the PCIe switching device A according to the identifier of the cache device N and the cache address N. The input/output manager A receives, via the PCIe switching device A, a response indicating that the to-be-written data is successfully written to the cache address M, and instructs the controller A to establish a correspondence among the address of the to-be-written data, the identifier of the cache device M, and the cache address M. Likewise, the controller A establishes a correspondence among the address of the to-be-written data, the identifier of the cache device N, and the cache address N.

In another embodiment, the controller A sends the identifier of the cache device M and the cache address M to the input/output manager A via the PCIe switching device A. The input/output manager A receives the identifier of the cache device M and the cache address M. The input/output manager A directly writes the to-be-written data to the cache address M via the PCIe switching device A or the PCIe switching device B according to the identifier of the cache device M and the cache address M. The controller A sends a write data instruction to the cache device M via the PCIe switching device A or the PCIe switching device B, where the write data instruction carries the identifier of the cache device N and the cache address N. The cache device M caches the to-be-written data, and the cache device M directly writes the to-be-written data to the cache address N via the PCIe switching device A or the PCIe switching device B according to the write data instruction.

The controller A only needs to obtain the cache address M and the cache address N that are allocated to the to-be-written data, so that the input/output manager A implements writing of the to-be-written data into the cache device M and the cache device N, thereby saving CPU computing resources of the controller A and memory resources of the controller A and improving data writing efficiency.

Figure 4:
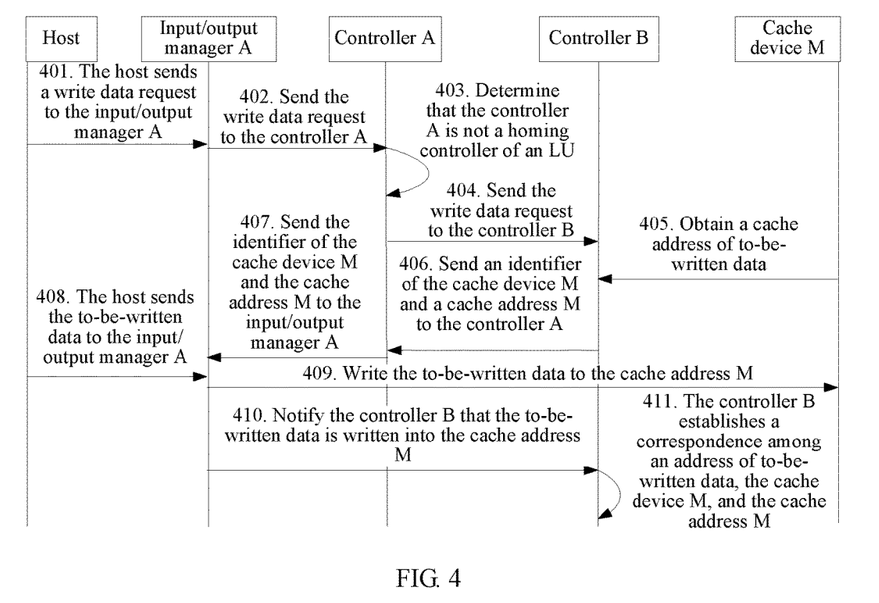
FIG. 4 is a flowchart of processing a write data request according to an embodiment of the present invention.

In another case, the input/output manager A receives a write data request of a host. The write data request carries an address of to-be-written data. The input/output manager A sends the write data request to the controller A by means of forwarding by the PCIe switching device A. The controller A receives the write data request sent by the input/output manager A, and determines, according to an identifier of a target LU that is carried in the write data request, that the controller A is not a home controller of the target LU. A specific embodiment is shown in FIG. 4.

Step 401: A host sends a write data request to an input/output manager A.

The host sends the write data request to the input/output manager A, where the write data request carries an address of to-be-written data.

Step 402: Send the write data request to a controller A.

In this embodiment of the present invention, the controller A is a home controller of the input/output manager A. The input/output manager A receives the write data request, and sends the write data request to the controller A via a PCIe switching device A or a PCIe switching device B. In this embodiment of the present invention, that the input/output manager A receives a write data request and sends the write data request to the controller A via the PCIe switching device A is used as an example.

Step 403: Determine that the controller A is not a home controller of a target LU.

The controller A receives the write data request sent by the input/output manager A, and determines, according to an identifier of the target LU of to-be-written data that is carried in the write data request, that the controller A is not a home controller of the target LU. The controller A queries a correspondence between a controller and an LU, and determines that a controller B is a home controller of the target LU.

Step 404: Send the write data request to a controller B.

The controller A sends the write data request to the controller B via the PCIe switching device A or the PCIe switching device B. In this embodiment, that the PCIe switching device B forwards the write data request to the controller B is used as an example.

Step 405: Obtain a cache address of the to-be-written data.

The controller B receives the write data request sent by the controller A, and determines a cache device used to cache the to-be-written data, which is the cache device M in this embodiment of the present invention. For a specific embodiment, refer to the manner in which the controller A obtains the cache address of the to-be-written data from the cache device M.

Step 406: Send an identifier of a cache device M and a cache address M to the controller A.

The controller B obtains the cache address M, and sends the identifier of the cache device M and the cache address M to the controller A via the PCIe switching device B. In another embodiment, the identifier of the cache device M and the cache address M may also be directly sent to the controller A via the PCIe switching device A or the PCIe switching device B.

Step 407: Send the identifier of the cache device M and the cache address M to the input/output manager A.

The controller A receives the identifier of the cache device M and the cache address M that are sent by the controller B, and sends the cache address M of the to-be-written data via the PCIe switching device.

Step 408: The host sends the to-be-written data to the input/output manager A.

The input/output manager A receives the identifier of the cache device M and the cache address M, and responds to the write data request sent by the host. The host sends the to-be-written data to the input/output manager A.

Step 409: Write the to-be-written data to the cache address M.

The input/output manager A receives the to-be-written data sent by the host, and directly writes the to-be-written data to the cache address M via the PCIe switching device A according to the identifier of the cache device M and the cache address M. The input/output manager A receives, via the PCIe switching device A, a response indicating that the to-be-written data is written successfully that is sent by the cache device M. The input/output manager A sends a response indicating that the write data request is completed to the host, and notifies the host that a write request operation is complete.

Step 410: Notify the controller B that the to-be-written data is written to the cache address M.

The input/output manager A writes the to-be-written data to the cache address M successfully, and notifies the controller B that the to-be-written data is written to the cache address M. This specifically includes that the input/output manager A forwards the notification to the controller A via the PCIe switching device A, and that the controller A forwards the notification to the controller B via the PCIe switching device B; or, the input/output manager A directly sends the notification to the controller B via the PCIe switching device A or the PCIe switching device B.

Step 411: The controller B establishes a correspondence among an address of the to-be-written data, the cache device M, and the cache address M.

The controller B establishes, according to the notification sent by the input/output manager A, a correspondence among the address of the to-be-written data, the cache device M, and the cache address M.

For how the cache device M establishes the correspondence between the address of the to-be-written data and the cache address M, refer to the description in the foregoing embodiment, and details are not described herein again.

A cache device N allocates a cache address N to the to-be-written data, thereby establishing a correspondence between the address of the to-be-written data and the cache address N. The cache device N may obtain the address of the to-be-written data from a cache address allocation instruction sent by the controller A, and after allocating the cache address N, the cache device N establishes a correspondence between the address of the to-be-written data and the cache address N.

To prevent loss of the to-be-written data cached in the cache device M, when the to-be-written data needs multiple cache devices to serve as caches, in a scenario in which the controller A is not a home controller of the target LU of the to-be-written data, the input/output manager A sends a write data request to the controller B. For a process thereof, refer to the description in the foregoing embodiment. For a process of obtaining the cache address of the to-be-written data by the controller B, refer to the scenario in which the controller A is a home controller of the target LU of the to-be-written data and the controller A obtains cache addresses of multiple cache devices. For other steps, also refer to the description in the foregoing embodiment, and details are not described herein again.

Figure 5:
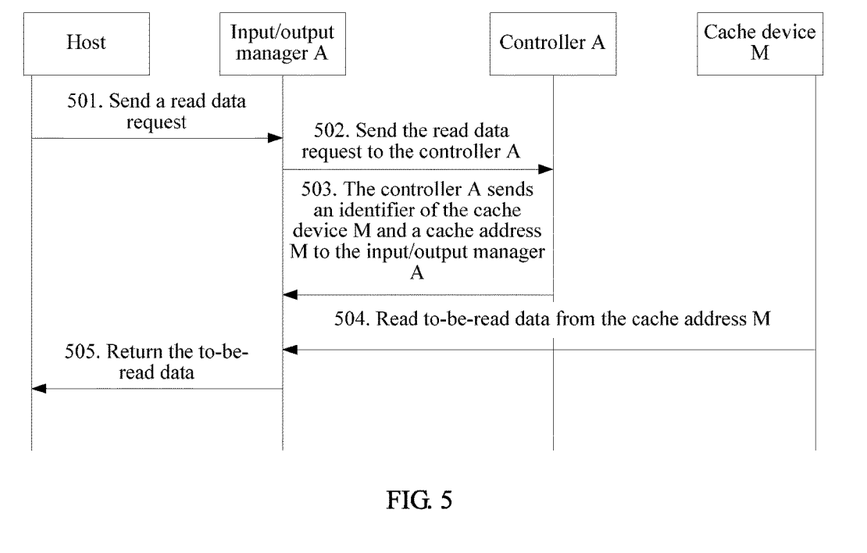
FIG. 5 is a flowchart of processing a read data request according to an embodiment of the present invention.

After the host writes data into the storage array, the host accesses the written data, that is, sends a read data request. A specific process is shown in FIG. 5.

Step 501: Send a read data request.

A host sends a read data request to an input/output manager A, where the read data request carries an address of to-be-read data. The address of the to-be-read data includes an identifier of a logical unit LU in which the to-be-read data is located, an LBA of the to-be-read data, and a length of the to-be-read data. Specifically, the host may send the read data request to the input/output manager A by using the SCSI protocol, which is not limited by the present invention. For ease of description, the to-be-read data here is the to-be-written data described above.

Step 502: Send the read data request to a controller A.

The input/output manager A receives the read data request sent by the host, and sends the read data request to the controller A via a PCIe switching device A.

Step 503: The controller A sends an identifier of a cache device M and a cache address M to an input/output manager A.

When the controller A is a home controller of the LU in which the to-be-read data is located and the to-be-read data is cached in a cache device such as the cache device M, a correspondence among the address of the to-be-read data, an identifier of the cache device, and the cache address is queried according to the read data request, and the cache address M used to cache the to-be-read data in the cache device M is determined. When the to-be-read data is still cached in the cache device M, the cache address of the to-be-read data in the cache device M is the cache address M. The controller A sends the identifier of the cache device M and the cache address M to the input/output manager A via the PCIe switching device A.

Step 504: Read the to-be-read data from the cache address M.

The input/output manager A directly reads the to-be-read data from the cache address M via the PCIe switching device A according to the identifier of the cache device M and the cache address M.

Step 505: Return the to-be-read data.

The input/output manager A reads the to-be-read data from the cache address M, and returns the to-be-read data to the host.

When the input/output manager A sends a to-be-read data query request to the controller A via the PCIe switching device A according to the read data request and the controller A is not a home controller of the LU in which the to-be-read data is located, the controller A queries a correspondence between the LU in which the to-be-read data is located and the home controller, and determines that a controller B is the home controller of the LU in which the to-be-read data is located. The controller A sends the to-be-read data query request to the controller B via a PCIe switching device B. That the foregoing to-be-written data is still the to-be-read data mentioned here is used as an example. Therefore, the address of the to-be-read data is the address of the to-be-written data described above. When the to-be-read data is still cached in the cache device M, the cache address of the to-be-read data in the cache device M is the cache address M. The controller B queries the correspondence among the address of the to-be-written data, the identifier of the cache device M, and the cache address M, determines the identifier of the cache device M that caches the to-be-read data and the cache address M, and sends the identifier of the cache device M and the cache address M to the controller A via the PCIe switching device B. The controller A sends the identifier of the cache device M and the cache address M to the input/output manager A via the PCIe switching device A. The controller B may also directly send the identifier of the cache device M and the cache address M to the input/output manager A via the PCIe switching device A or the PCIe switching device B. For a subsequent read operation, refer to the read operation in the foregoing embodiment, and details are not described herein again.

That the foregoing to-be-written data is still the to-be-read data mentioned here is used as an example. Therefore, an address of to-be-read data is the address of the to-be-written data described above. When the to-be-read data is already stored in a target SSD, a home controller of the LU in which the to-be-read data is located queries a correspondence between the address of the to-be-read data (the address of the to-be-written data) and a storage address of the to-be-read data in the target SSD, obtains the storage address of the to-be-read data in the target SSD, and sends the storage address of the to-be-read data in the target SSD to the input/output manager A via the PCIe switching device A or the PCIe switching device B. The storage address of the to-be-read data in the target SSD includes an identifier of a controller of the target SSD and a logical storage address of the to-be-read data in the target SSD. The input/output manager A reads the to-be-read data from the logical storage address of the to-be-read data in the target SSD directly via the PCIe switching device A or the PCIe switching device B according to the storage address of the to-be-read data in the target SSD.

In the foregoing embodiment, when the to-be-read data is partly saved in the target SSD and partly cached in the cache device M in this embodiment of the present invention, as described above, the input/output manager A directly reads data from the cache address via the PCIe switching device A or the PCIe switching device B according to the cache address of the to-be-read data in the cache device; and the input/output manager A directly reads data from the logical storage address in the target SSD via the PCIe switching device A or the PCIe switching device B according to the identifier of the controller of the target SSD and the logical storage address of the to-be-read data in the target SSD, which is not described in detail herein.

When multiple cache devices perform an operation of caching the to-be-read data, generally the home controller of the LU in which the to-be-read data is located returns, to the input/output manager A, an identifier of a primary cache device M that caches the to-be-read data and the cache address M. For other procedural operations, refer to the read operation in the foregoing embodiment, and details are not described herein again.

In the storage array, data deduplication is performed, which can save storage space and reduce storage costs. In the storage array shown in FIG. 2 according to the embodiment of the present invention, the host sends a write data request to the input/output manager A, where the write data request carries an address of to-be-written data. The input/output manager A sends the write data request to the controller A via the PCIe switching device A. When the controller A is the home controller of the target LU of the to-be-written data, the controller A provides the identifier of the cache device M and the cache address M for the input/output manager A. The input/output manager A directly writes the to-be-written data to the cache address M via the PCIe switching device A or the PCIe switching device B according to the identifier of the cache device M and the cache address M.

Before the to-be-written data cached in the cache device M is stored into the SSD of the storage array, data deduplication is performed, which can save storage space effectively and improve a utilization rate of the storage space. Using the storage array shown in FIG. 2 as an example, as regards the data stored in the storage array SSD, before the data is stored by the cache device M into the SSD, data deduplication is performed. A data deduplication technology is to divide data into data blocks according to a preset rule and calculate an eigenvalue of a data block. The eigenvalue of the data block is generally calculated by using a Hash algorithm. A Hash operation is performed on the data block to obtain a Hash value, which is used as the eigenvalue. Common Hash algorithms include MD5, SHA1, SHA-256, SHA-512, and the like. For example, if an eigenvalue of a data block A is the same as an eigenvalue of a data block B already stored in the SSD, the data block A and the data block B are identical. Therefore, the duplicate data block A is deleted from the cache device M, and a logical storage address for storing the data block B in the SSD is used as a logical storage address of the data block A in the SSD.

In specific implementation, the comparing of eigenvalues of data blocks is implemented by a controller. Because data deduplication is performed in the storage array, and each unique data block has an eigenvalue, many eigenvalues are generated. To implement a balance between controllers in the storage array, each controller is responsible for comparing of eigenvalues of some data blocks according to a data block eigenvalue distribution algorithm such as a Hash distribution algorithm. In this way, each controller maintains only eigenvalue indexes of some unique data blocks stored in the storage array according to the data block eigenvalue distribution algorithm, where the eigenvalue indexes of some unique data blocks are referred to as an eigenvalue index set. The controller queries the eigenvalue index set for an eigenvalue of a data block that is to be written into the SSD, and determines whether the eigenvalue is the same as an eigenvalue in the eigenvalue index set. For example, the controller A needs to maintain an eigenvalue index set A according to the eigenvalue distribution algorithm, and therefore, the controller A is a home controller of every eigenvalue in the eigenvalue index set A; or, a controller in which an eigenvalue from the eigenvalue index set A is the same as an eigenvalue of a data block X is both a home controller of the eigenvalue of the data block X and a home controller of every eigenvalue in the eigenvalue index set A.

Figure 6:
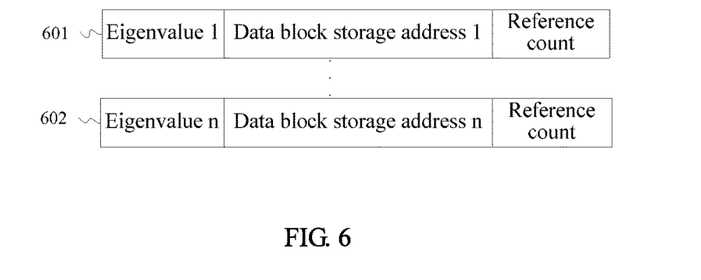
FIG. 6 is a schematic diagram of an eigenvalue index set of data blocks.

Specifically, the eigenvalue index set is formed by eigenvalue indexes, as shown in FIG. 6. For example, an index 601 of an eigenvalue 1 includes the eigenvalue 1, a data block storage address 1, and a reference count; an index 602 of an eigenvalue n includes the eigenvalue n, a data block storage address n, and a reference count. The data block storage address 1 is used to represent a storage address of a unique data block C in an SSD A or a storage address of the data block C in a cache device. The storage address of the data block C in the SSD A may include an identifier of a controller of the SSD A and a logical storage address of the data block C stored in the SSD A. The storage address of the data block C in the cache device includes an identifier of the cache device and a cache address. The eigenvalue 1 represents an eigenvalue of the data block C. The reference count represents a quantity of data blocks with eigenvalue 1. For example, when the data block A is stored in the storage array for the first time, if the quantity of data blocks with the eigenvalue 1 is 1, the reference count is 1. When a data block D with the same eigenvalue 1 is stored into the SSD again, the data block D is not saved in the SSD according to a principle of data deduplication, but the reference count increases by 1 and is updated to 2. In summary, a data block storage address in an eigenvalue index is a storage address of a data block in a cache device or a storage address of the data block in a target hard disk. The storage address of the data block in the cache device includes an identifier of the cache device and a cache address of the data block in the cache device; and the storage address of the data block in a target hard disk includes an identifier of a controller of a target hard disk and a logical storage address for storing the data block in the target hard disk. The eigenvalue index shown in FIG. 6 is merely exemplary implementation, and the eigenvalue index may also be a multi-level index. The index may be any form of index that can be used for data deduplication, which is not limited by this embodiment of the present invention.

Figure 7:
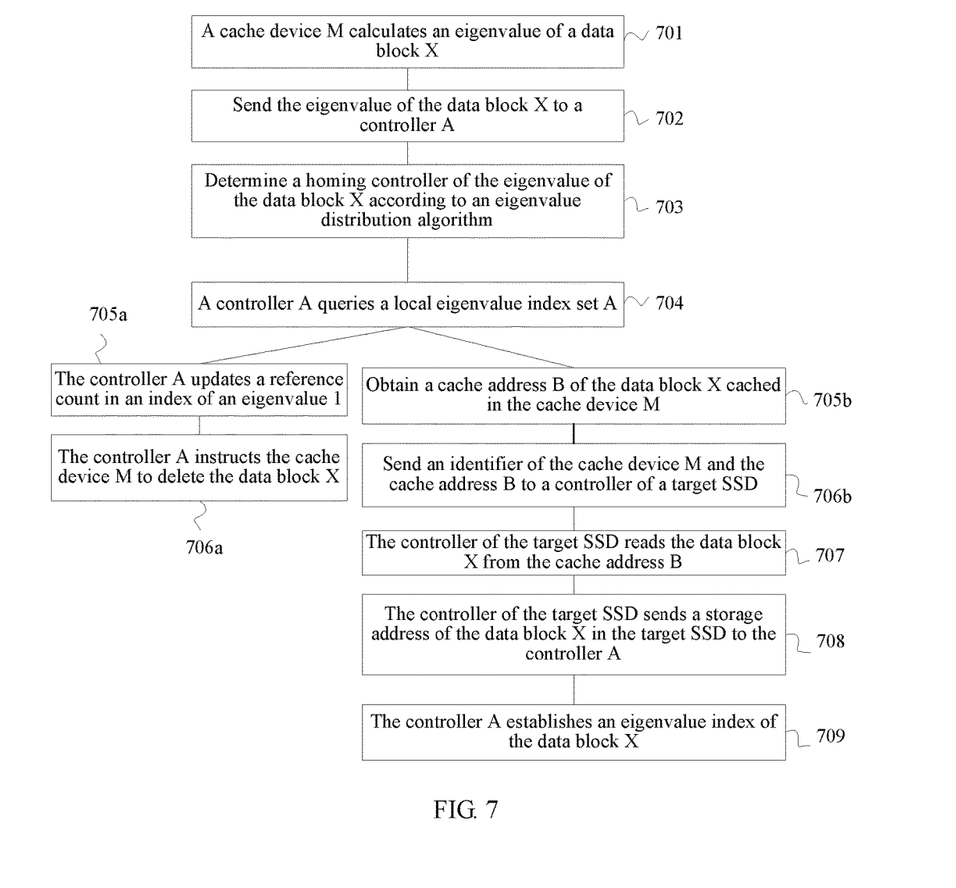
FIG. 7 is a flowchart of data deduplication processing according to an embodiment of the present invention.

In the storage array shown in FIG. 2, that the controller A serves as a home controller of a target LU of a data block cached in the cache device M is used as an example. With reference to the foregoing embodiment, after receiving a write data request, the input/output manager A obtains an identifier of the cache device M and the cache address M from the controller A. The input/output manager A directly writes the to-be-written data to the cache address M via the PCIe switching device A or the PCIe switching device B according to the identifier of the cache device M and the cache address M. The controller A establishes a correspondence among the address of the to-be-written data, the identifier of the cache device M, and the cache address M. When data cached in an LU of home controller A is written from the cache device M to an SSD, the data at the cache address M is used as an example. Generally, when data deduplication is being performed, an eigenvalue of a data block needs to be calculated. To calculate an eigenvalue of a data block, data needs to be divided first according to a specific rule to obtain data blocks. There may be two methods for division into data blocks: dividing the data into data blocks of a fixed length, or dividing the data into data blocks of variable lengths. In this embodiment of the present invention, that the data is divided into data blocks of a fixed length is used as an example. For example, the data is divided into data blocks in a 4 KB size. For example, to-be-written data written to the cache address M is divided into several data blocks in a 4 KB size. The controller A records an identifier of an LU of each data block, an LBA of the data block, and a length of the data block. The identifier of the LU of the data block, the LBA of the data block, and the length of the data block are hereinafter referred to as a data block storage address. Using a data block X in several data blocks in a 4 KB size as an example (herein the data block X is referred to as a data block to be deduplicated, briefly known as to-be-deduplicated data block), the controller A sends a data block eigenvalue request to the cache device M via the PCIe switching device A or the PCIe switching device B, where the eigenvalue request includes an address of the data block X. The cache device M sends an eigenvalue of the data block X to the controller A via the PCIe switching device A or the PCIe switching device B to perform data deduplication. As shown in FIG. 7, a specific process includes:

Step 701: A cache device M calculates an eigenvalue of a data block X.

A controller A sends to the cache device M an instruction to obtain the eigenvalue of the data block X, where the instruction carries an address of the data block X. The cache device M receives the instruction to obtain the eigenvalue of the data block X that is sent by the controller A. In a case, the cache device M stores a correspondence between the address of the data block X and a cache address B, and determines the data block X according to the address of the data block X that is carried in the instruction to obtain the eigenvalue of the data block X, calculates the eigenvalue of the data block X, and caches the eigenvalue of the data block X in a cache address X.

Step 702: Send the eigenvalue of the data block X to the controller A.

The cache device M obtains the eigenvalue of the data block X, and sends a response message of the eigenvalue of the data block X to a home controller A of an LU in which the data block X is located, where the response message of the eigenvalue of the data block X carries the eigenvalue of the data block X. In addition, the response message of the eigenvalue of the data block X further carries an identifier of the cache device M that caches the eigenvalue of the data block X, and the cache address X of the eigenvalue of the data block X in the cache device M.

Step 703: Determine a home controller of the eigenvalue of the data block X according to an eigenvalue distribution algorithm.

Step 704: The controller A queries a local eigenvalue index set A.

When the controller A is the home controller of the eigenvalue of the data block X, the controller A queries the local eigenvalue index set A, and determines whether an eigenvalue same as the eigenvalue of the data block X exists in the eigenvalue index set A.

When an eigenvalue which is the same as the eigenvalue of the data block X exists in the eigenvalue index set A, steps 705*a* and 706*a* are performed. As shown in FIG. 6, the eigenvalue of the data block X is the same as the eigenvalue 1. That is, the data block X is the same as the data block A.

Step 705*a*: The controller A updates a reference count in an index of an eigenvalue 1.

The reference count in the index of the eigenvalue 1 is 1, that is, only the data block A exists in the storage array. It is found that the eigenvalue of the data block X is the same as the eigenvalue 1, and therefore, the reference count is updated to 2.

Step 706*a*: The controller A instructs the cache device M to delete the data block X.

The controller A instructs the cache device M to delete the data block X. The controller A establishes a correspondence between the address of the data block X and the eigenvalue of the data block X, or the controller A establishes a correspondence among the address of the data block X, the eigenvalue of the data block X, and a storage address of the data block A.

It is determined in step 704 that the data block X is a duplicate data block. Therefore, the data block X does not need to be saved into an SSD, and the cache device M is instructed to delete the data block X.

When no eigenvalue same as the eigenvalue of the data block X exists in the eigenvalue index set A, steps 705*b*, 706*b*, 707, 708, 709, and 710 are performed.

Step 705*b*: Obtain a cache address B of the data block X cached in the cache device M.

The controller A obtains the cache address B of the data block X from the cache device M via the PCIe switching device A according to the cache address X of the eigenvalue of the data block X in the cache device M.

Step 706b: Send an identifier of the cache device M and the cache address B to a controller of a target SSD.

The controller A obtains the identifier of the cache device M and the cache address B, and sends the identifier of the cache device M and the cache address B to the controller of the target SSD via the PCIe switching device A or the PCIe switching device B.

Step 707: The controller of the target SSD reads the data block X from the cache address B.

The controller of the target SSD receives the identifier of the cache device M and the cache address B, and directly reads, according to the identifier of the cache device M and the cache address B, the data block X from the cache address B via the PCIe switching device A or the PCIe switching device B.

Step 708: The controller of the target SSD sends a storage address of the data block X in the target SSD to the controller A.

The controller of the target SSD reads the data block X from the cache address B, and stores the data block X into the target SSD. The controller of the target SSD sends a storage address of the data block X in the target SSD to the controller A via the PCIe switching device A. The storage address of the data block X in the target SSD includes an identifier of the controller of the target SSD and a logical storage address for storing the data block X in the target SSD.

Step 709: The controller A establishes an eigenvalue index of the data block X.

The controller A receives the storage address of the data block X in the target SSD, establishes the eigenvalue index of the data block X, and sets the reference count to 1. The controller A establishes a correspondence among the address of the data block X, the eigenvalue of the data block X, and the storage address of the data block X in the target SSD. The controller A also needs to record the cache address X of the eigenvalue of the data block X. When the eigenvalue of the data block X is stored into the SSD, the controller A also needs to record the storage address of the eigenvalue of the data block X in the target SSD.

In another case, the controller A is not the home controller of the eigenvalue of the data block X but only a home controller of an LU in which the data block X is located. In this embodiment of the present invention, that a controller B is the home controller of the eigenvalue of the data block X is used as an example, and the controller A sends the eigenvalue of the data block X to the controller B via the PCIe switching device A or the PCIe switching device B. The controller B receives the eigenvalue of the data block X that is sent by the controller A, and queries an eigenvalue index set B of the controller B. When the controller B finds that an eigenvalue same as the eigenvalue of the data block X exists in the eigenvalue index set A, for example, an eigenvalue of a data block R is same as the eigenvalue of the data block X, the controller B instructs the cache device M to delete the data block X. This specifically includes that the controller B sends a delete instruction to the controller A via the PCIe switching device B. The controller A sends the delete instruction to the cache device M via the PCIe switching device A, and the cache device M deletes the data block X. The controller B updates the reference count of the index of the eigenvalue same as the eigenvalue of the data block X, that is, increases the reference count by 1. When the data block R is already stored in the SSD, the storage address of the data block R in an index of the data block R includes an identifier of a controller of the SSD that stores the data block R, and a logical storage address for storing the data block R in the SSD. When the data block R is in the cache device, the storage address of the data block R in the index of the data block R includes the identifier of the cache device and a cache address. The controller A establishes a correspondence among the address of the data block X, the eigenvalue of the data block X, and the address of the home controller B of the eigenvalue of the data block X, and therefore, the controller A does not require a correspondence among the address of each data block, the eigenvalue of the data block, and the storage address of the data block, and an amount of data stored by the controller A is reduced effectively. Alternatively, the controller A establishes a correspondence among the address of the data block X, the eigenvalue of the data block X, and the storage address of the data block R. When reading the data block X subsequently, the controller A can directly determine the storage address of the data block R by querying the correspondence among the address of the data block X, the eigenvalue of the data block X, and the storage address of the data block R, and the input/output manager A directly reads the data block X from the storage address of the data block R via the PCIe switching device A or the PCIe switching device B, thereby improving data reading efficiency.

When the controller A is only the home controller of the LU in which the data block X is located, but not the home controller of the eigenvalue of the data block X, the controller B finds that no eigenvalue same as the eigenvalue of the data block X exists in the eigenvalue index set B, the controller B obtains the cache address B of the data block X in the cache device M by sending a request to the controller A via the PCIe switching device B. The controller A sends the request to the cache device M via the PCIe switching device A. The cache device M sends the identifier of the cache device M and the cache address B to the controller B. The controller B sends the identifier of the cache device M and the cache address B to the controller of the target SSD via the PCIe switching device A or the PCIe switching device B (here the PCIe switching device A is used as an example). The controller of the target SSD directly reads the data block X from the cache address B via the PCIe switching device A or the PCIe switching device B according to the identifier of the cache device M and the cache address B, and stores the data block X into the target SSD. The controller of the target SSD sends the storage address of the data block X in the target SSD to the controller B via the PCIe switching device A or the PCIe switching device B. The controller B receives the storage address of the data block X in the target SSD, establishes the eigenvalue index of the data block X, and sets a reference count in the index to 1. The controller B also needs to record the cache address X of the eigenvalue of the data block X. When the eigenvalue of the data block X is stored into the SSD, the controller B also needs to record the storage address of the eigenvalue of the data block X in the SSD.

The controller B receives the storage address of the data block X in the target SSD, and sends a notification to the controller A. The notification carries the storage address of the data block X in the target SSD. The controller A establishes a correspondence among the address of the data block X, the eigenvalue, and the storage address of the data block X in the target SSD according to the notification sent by the controller B. In another embodiment, when the controller A is only the home controller of the LU in which the data block X is located, but not the home controller of the eigenvalue of the data block X, the controller A establishes a correspondence among the address of the data block X, the eigenvalue of the data block X, and the address of the controller B.

According to the storage array in this embodiment of the present invention, the cache device implements calculation of a fingerprint of the data block X, which saves computing resources of the controller. During a process of storing the data block X into the target SSD, the controller provides only the identifier of the cache device M and the cache address B, and the controller of the target SSD directly reads the data block X from the cache address B, which saves computing resources and memory resources of the controller and improves performance of the storage array.

Based on the storage array shown in FIG. 2, data is written into the SSD according to the foregoing data deduplication operation. When the input/output manager A receives a read data request, for example, a request to read the data block X, where the read data request carries the address of the data block X, the input/output manager A sends the read data request to the controller A via the PCIe switching device A. The controller A determines that the controller A is the home controller of the LU in which the data block X is located. In an embodiment, the controller A searches the correspondence among the address of the data block X, the eigenvalue of the to-be-read data block X, and the storage address of the data block X in the target SSD to determine the storage address of the data block X in the target SSD. The controller A sends the storage address of the data block X in the target SSD to the input/output manager A via the PCIe switching device A. The input/output manager A directly reads the data block X from a logical storage address of the data block X in the target SSD via the PCIe switching device A or the PCIe switching device B according to the storage address of the to-be-read data block, data block X, in the target SSD. In another embodiment, the controller A searches the correspondence among the address of the data block X, the eigenvalue of the data block X, and the address of the home controller of the eigenvalue of the data block X, to determine the home controller B of the eigenvalue of the data block X, queries an eigenvalue index of the data block X in the controller B, to determine the storage address of the data block X in the target SSD; or determines the home controller B of the eigenvalue of the data block X, and queries an eigenvalue index of a data block with an eigenvalue same as the eigenvalue of the data block X in the controller B to determine the storage address of the data block with an eigenvalue same as the eigenvalue of the data block X, and then reads data from the storage address of the data block with an eigenvalue same as the eigenvalue of the data block X. When the controller A is both the home controller of the LU in which the data block X is located and the home controller of the eigenvalue of the data block X, in another embodiment, the controller A searches the correspondence between the address of the to-be-read data block X and the eigenvalue of the data block X, and queries, according to the eigenvalue of the data block X, the eigenvalue index set A maintained by the controller A, to determine the storage address of the to-be-read data block X, and then sends the storage address of the to-be-read data block X to the input/output manager A. The input/output manager A reads the data block from the storage address of the data block X via the PCIe switching device A or the PCIe switching device B.

When the data written in the storage array shown in FIG. 2 is cached into multiple cache devices, when a data deduplication operation being performed, data deduplication is performed only on the data in one of the cache devices. Specifically, data deduplication may be performed on data in a primary cache device, or according to a load of multiple cache devices that cache the data, one of the cache devices is selected to perform the data deduplication operation, which is not limited by this embodiment of the present invention.

In this embodiment of the present invention, in another implementation case, the concept of homing does not necessarily exist between an input/output manager and a controller. That is, the controller A is not a home controller of the input/output manager A. Each input/output manager saves a correspondence between an LU and a controller to which the LU is homed. The input/output manager queries, according to an identifier of a target LU that is carried in a data operation request, a correspondence between the identifier of the target LU and a home controller to determine a home controller of the target LU, and directly sends the request to the home controller of the target LU via the PCIe switching device A or the PCIe switching device B. In addition, communication may be performed, via any PCIe switching device, between controllers, or between a controller and an SSD, or between an input/output manager and a controller, or between an input/output manager and an SSD, or between a cache device and a controller, or between a cache device and an SSD. In this embodiment of the present invention, a logical storage address for storing a data block X in a storage address in a target hard disk refers to a logical block address for storing the data block X in the target hard disk, and specifically refers to a logical block address for storing the data block X in the target SSD in the embodiment of the present invention.

FIG. 2 in this embodiment of the present invention shows only two controllers, two switching devices, two input/output managers and one cache device. However, in specific implementation, the quantities of controllers, switching devices, input/output managers, and cache devices may be set as required and flexibly expanded. Any input/output manager is connected to any controller via any switching device, or any input/output manager is connected to any hard disk via any switching device, or any input/output manager is connected to any cache device via any switching device. Any controller is connected to any controller via any switching device, or any controller is connected to any hard disk via any switching device, or any controller is connected to any cache device via any switching device. Any cache device is connected to any hard disk via a switching device. Bidirectional communication is implemented between any two devices connected via any switching device. Any two switching devices are directly connected. In a storage array architecture provided in this embodiment of the present invention, logically, controllers are collectively referred to as a controller plane, switching devices are collectively referred to as a switching plane, hard disks are collectively referred to as a storage plane, input/output managers are collectively referred to as an input/output management plane, and cache devices are collectively referred to as a cache plane. In the architecture provided in this embodiment of the present invention, data reading and writing control is separated from data reading and writing. A controller implements data reading and writing control, but data reading and writing (or in other words, read and written data) does not flow through the controller, which saves CPU computing resources of the controller and memory resources of the controller, improves data writing efficiency, and improves data processing efficiency of the storage array. The storage array architecture in this embodiment of the present invention can implement expansion of devices such as controllers and hard disks, and controllers, switching devices, hard disks and the like may be added flexibly according to performance requirements of the storage array.

Alternatively, the technical solution in this embodiment of the present invention is also applicable to a scenario in which a storage array includes one input/output manager, one controller, one switching device, one cache device, and several hard disks. For a manner of writing data into the storage array in this scenario, refer to the description in the foregoing embodiment. For a scenario in which data deduplication is performed in the storage array, refer to the description in the foregoing embodiment. For a data reading operation performed in a storage array, refer to the description in the foregoing embodiment. Alternatively, a storage array may also include two controllers and one switching device, where the two controllers are connected to the switching device. For operations of data writing, data deduplication and data reading in such a scenario, refer to the description in the foregoing embodiment, and details are not described herein again.

In this embodiment of the present invention, a device A reads data from a cache address A (or in other words, directly reads data from the cache address A) or writes data to the cache address A (or in other words, directly writes data to the cache address A) via the PCIe switching device A or the PCIe switching device B according to an identifier of a device B and the cache address A. Such an embodiment may be implemented by using a direct memory access (DMA) technology, where the device A and the device B represent devices that specifically perform DMA access in this embodiment of the present invention.

The controller obtains a cache address of the device B, and sends the identifier of the device B and the cache address of the device B to a device C via the PCIe switching device A or the PCIe switching device B. Because the controller communicates with the device B to obtain the cache address via the PCIe switching device A or the PCIe switching device B and already learns the identifier of the device B, the cache address is obtained, and the identifier of the device B and the cache address of the device B may be sent to the device C. Alternatively, the controller may also obtain the identifier and cache address of the device B. The identifier of the device B may be the address of the device B or another identifier that uniquely identifies the device.

A person of ordinary skill in the art may be aware that, the exemplary units and algorithm steps described with reference to the embodiments disclosed in the specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable non-volatile storage medium. Based on such an understanding, the technical solutions of the present invention essentially, or the part contributing to the prior art, or some of the technical solutions may be implemented in a form of a software product. The software product is stored in a non-volatile storage medium, and includes several instructions for instructing a computer device (which may be a personal computer, a server, or a network device) to perform all or some of the steps of the methods described in the embodiments of the present invention. The foregoing non-volatile storage medium includes: any medium that can store program code, such as a USB flash drive, a removable hard disk, a read-only memory (ROM), a magnetic disk, or an optical disc.

What is claimed is:

1. A method for processing a write data request in a storage array comprising an input/output manager, a switching device, a first controller, and a first cache device, and wherein the input/output manager, the first controller and the first cache device are coupled to the switching device, and the switching device is coupled to a storage unit in the storage array; the method comprising:
   sending, by the input/output manager, a write data request to the first controller via the switching device;
   obtaining, by the first controller for the write data request, a first cache address in the first cache device for storing data of the write data request;
   sending, by the first controller, an identifier of the first cache device and the first cache address to the input/output manager, via the switching device; and
   writing, by the input/output manager, the data of the write data request to the first cache address via the switching device according to the identifier of the first cache device and the first cache address.

2. The method according to claim 1, wherein the write data request includes an address of the data; and the method further comprises:
   receiving, by the input/output manager, a response sent by the first cache device, indicating that the data is written successfully;
   sending a notification to the first controller from the input/output manager via the switching device, that the data is written to the first cache address; and establishing by the first controller, according to the notification, a correspondence among the address of the data, the identifier of the first cache device, and the first cache address.

3. The method according to claim 1, wherein the storage array further comprises a second cache device, wherein the second cache device is coupled to the switching device, and the method further comprises:
obtaining, by the first controller for the write data request, a second cache address from the second cache device for storing the data;
sending, by the first controller, an identifier of the second cache device and the second cache address to the input/output manager, via the switching device; and
writing, by the input/output manager, the data to the second cache address via the switching device, according to the identifier of the second cache device and the second cache address.

4. The method according to claim 1, wherein the storage array further comprises a second cache device, wherein the second cache device is coupled to the switching device, the method further comprising:
obtaining, by the first controller for the write data request, a second cache address from the second cache device for storing the data;
sending, by the first controller, a write data instruction to the first cache device via the switching device, wherein the write data instruction includes an identifier of the second cache device and the second cache address; and
writing, by the first cache device, according to the write data instruction, the data to the second cache address, via the switching device.

5. The method according to claim 1, wherein the write data request includes an address of the data, wherein the address of the data comprises an identifier of a target logical unit (LU) in which the data is located, a logical block address of the data, and a length of the data; and the method further comprising:
querying, by the input/output manager, according to the identifier of the target LU, a homing relationship between the target LU and the first controller that is stored in the input/output manager, and identifying that the first controller is a home controller of the target LU; and
sending, by the input/output manager, the write data request to the first controller via the switching device.

6. The method according to claim 1, wherein the write data request includes an address of the data, wherein the address of the data comprises an identifier of a target logical unit (LU) in which the data is located, a logical block address of the data, and a length of the data; the storage array further including a second controller, wherein the second controller is coupled to the switching device; the method further comprising:
sending, by the input/output manager, the write data request to the second controller via the switching device;
determining, by the second controller according to the identifier of the target LU, that the first controller is a home controller of the target LU; and
sending, by the second controller, the write data request to the first controller via the switching device.

7. A storage array, including an input/output manager, a switching device, a first controller, and a first cache device, wherein the input/output manager, the first controller, and the first cache device are coupled to the switching device; and the switching device is coupled to a storage unit in the storage array;
the input/output manager is configured to send a write data request to the first controller via the switching device;
the first controller is configured to obtain, a first cache address in the first cache device for storing data of the write data request, for the write data request, and send an identifier of the first cache device and the first cache address to the input/output manager via the switching device; and
the input/output manager is further configured to write the data to the first cache address via the switching device according to the identifier of the first cache device and the first cache address.

8. The storage array according to claim 7, wherein the write data request includes an address of the data;
the input/output manager is further configured to receive from the first cache device, a response indicating that the data is written successfully, and send a notification to the first controller, via the switching device, that the data is written to the first cache address; and
the first controller is further configured to establish a correspondence among the address of the data, the identifier of the first cache device, and the first cache address, according to the notification.

9. The storage array according to claim 7, wherein the storage array further comprises a second cache device, wherein the second cache device is coupled to the switching device;
the first controller is further configured to obtain, for the write data request, a second cache address from the second cache device for storing the data, and send an identifier of the second cache device and the second cache address to the input/output manager via the switching device; and
the input/output manager is further configured to write the data to the second cache address via the switching device, according to the identifier of the second cache device and the second cache address.

10. The storage array according to claim 7, wherein the first controller is further configured to obtain a second cache address from the second cache device for storing the data for the write data request, and send a write data instruction to the first cache device via the switching device, wherein the write data instruction includes an identifier of the second cache device and the second cache address; and
the first cache device is configured to write the data to the second cache address via the switching device, according to the write data instruction.

11. The storage array according to claim 7, wherein the write data request includes an address of the data, wherein the address of the data comprises an identifier of a target logical unit (LU) in which the data is located, a logical block address of the data, and a length of the data; and the input/output manager is further configured to query a homing relationship between the target LU and the first controller that is stored in the input/output manager according to the identifier of the target LU, identify that the first controller is a home controller of the target LU, and send the write data request to the first controller via the switching device.

12. The storage array according to claim 7, wherein the write data request includes an address of the data, wherein the address of the data comprises an identifier of a target logical unit (LU) in which the data is located, a logical block address of the data, and a length of the data; the storage array further comprises a second controller, wherein the second controller is coupled to the switching device; the input/output manager is further configured to send the write data request to the second controller via the switching device;

the second controller is further configured to determine that the first controller is a home controller of the target LU according to the identifier of the target LU, and send the write data request to the first controller via the switching device.

* * * * *